US008856798B2

(12) United States Patent
Stahl (10) Patent No.: US 8,856,798 B2
(45) Date of Patent: Oct. 7, 2014

(54) MOBILE COMPUTING DEVICE ACTIVITY MANAGER (75) Inventor: Nathaniel R. Stahl, San Francisco, CA (US)

(73) Assignee: QUALCOMM Incorporated, San Diego, CA (US)

( * ) Notice: Subject to any disclaimer, the term of this patent is extended or adjusted under 35 U.S.C. 154(b) by 183 days.

(21) Appl. No.: 13/278,542

(22) Filed: Oct. 21, 2011

(65) Prior Publication Data
US 2012/0102497 A1 Apr. 26, 2012

Related U.S. Application Data (60) Provisional application No. 61/405,603, filed on Oct. 21, 2010.

(51) Int. Cl.
G06F 9/46 (2006.01)
G06F 9/50 (2006.01)
(52) U.S. Cl.
CPC .......... *G06F 9/50* (2013.01); *G06F 2209/5021* (2013.01)
USPC ............ 718/104; 718/100; 718/102; 718/103
(58) Field of Classification Search
None
See application file for complete search history.

(56) References Cited

U.S. PATENT DOCUMENTS

| 7,444,635 | B2 * | 10/2008 | Lehtinen | 718/104 |
|---|---|---|---|---|
| 2005/0091510 | A1 * | 4/2005 | McKeon et al. | 713/185 |
| 2005/0198331 | A1 * | 9/2005 | Okajima et al. | 709/229 |
| 2006/0041740 | A1 * | 2/2006 | Hsu | 713/2 |
| 2007/0099640 | A1 * | 5/2007 | Khushu et al. | 455/502 |
| 2007/0260669 | A1 * | 11/2007 | Neiman et al. | 709/201 |
| 2008/0201383 | A1 * | 8/2008 | Honigfort | 707/200 |
| 2008/0205616 | A1 * | 8/2008 | Teng et al. | 379/202.01 |
| 2009/0171742 | A1 * | 7/2009 | Klett et al. | 705/8 |
| 2009/0199190 | A1 * | 8/2009 | Chen et al. | 718/102 |
| 2009/0292819 | A1 * | 11/2009 | Kandekar et al. | 709/231 |
| 2010/0153945 | A1 * | 6/2010 | Bansal et al. | 718/1 |
| 2011/0072436 | A1 * | 3/2011 | Gilat et al. | 718/104 |
| 2011/0138381 | A1 * | 6/2011 | Hauser | 718/1 |
| 2011/0185013 | A1 * | 7/2011 | Obata et al. | 709/203 |
| 2011/0225464 | A1 * | 9/2011 | Guday et al. | 714/48 |
| 2011/0247003 | A1 * | 10/2011 | Fong et al. | 718/104 |

* cited by examiner

Primary Examiner — Charles Swift
(74) Attorney, Agent, or Firm — Mahamedi Paradice LLP

(57) ABSTRACT

A system and a method are disclosed for an activity manager providing a centralized component for allocating resources of a mobile computing device among various activities. An activity represents work performed using computing device resources, such as processor time, memory, storage device space or network connections. An application or system service requests generation of an activity by the activity manager, causing the activity manager to associate a priority level with the activity request and identify resources used by the activity. Based on the priority level, resources used and current resource availability of the mobile computing device, the activity manager determines when the activity is allocated mobile computing device resources. Using the priority level allows the activity manager to optimize performance of certain activities, such as activities receiving data from a user.

21 Claims, 5 Drawing Sheets

MOBILE COMPUTING DEVICE ACTIVITY MANAGER

CROSS REFERENCE TO RELATED APPLICATIONS

This application claims the benefit of U.S. Provisional Application No. 61/405,603, filed Oct. 21, 2010, the contents of which are incorporated by reference in its entirety.

BACKGROUND

1. Field of Art

The disclosure generally relates to the field of resource management in a mobile computing device.

2. Description of Art

Mobile computing systems with telephonic functionality, such as smartphones, are rapidly growing in popularity. The install base of such systems is about to exceed the install base of personal computers. Additionally, advances in processor and storage device design allow smartphones to provide a wide range of functionality. For example, devices such as smartphones execute various functions through applications, such as transmitting or receiving e-mails, transmitting or receiving text messages, maintaining a user's calendar, maintaining a user's contact database or other functionality by accessing resources of the smart phone. In conventional smartphones, or other mobile computing devices, each application separately requests use of smartphone resources, such as processor time, memory or network connections, as needed. Typically, smartphone resources are then allocated when access to resources is requested, although limited prioritization may be used to allow certain applications to receive resources before lower-priority applications.

SUMMARY

Despite increases in processor and storage device design, the compact size of mobile computing devices and the rapid development of application functionality continue to limit the resources available to a mobile computing device. Because of resource limitations in mobile computing devices, execution of multiple applications may impair application performance by reducing the resources available to various applications. Because each executing application, or service, independently requests mobile computing device resources, each application is unaware of the resources being used by other applications. As a result, the limited computing resources on a mobile computing device and the independent request and use of resources by different applications result in sub-optimal resource allocation that impairs performance of applications executed on a mobile computing device.

To address these problems, an activity manager in one example embodiment is configured to receive and process all requests for resources on a mobile computing device. Applications and services request mobile computing device resources by submitting requests to execute activities. For example, an e-mail application might submit an activity request to synchronize the user's e-mail messages with a remote server. Upon receiving and validating the request, the activity manager identifies the resource requirements of the activity and assigns a priority level to the activity. The priority levels are assigned in a way that improves the user's interactions with the mobile computing device. For example, activity requests that originate from the application being used by the user receive a first priority level that gives them preferential access to mobile computing device resources. Meanwhile, activities requested by background services that do not interact with the user receive a lower priority level and are not allocated resources until higher priority activities are executed. Once an activity request has been processed by the activity manager, it is saved as an activity object.

The activity manager assigns resources to activity objects based on their priority level, their resource requirements, and the availability of resources on the mobile computing device. An activity object is marked as runnable once the resources required for its execution become available and any trigger conditions are met. The runnable activity objects are then assigned to different time intervals based on their priority levels, and the activity manager allocates resources to the activity objects and marks them to indicate that they are being executed. By assigning a priority level to each activity and allocating resources based on the priority levels of different pending activities, the activity manager can optimize the performance of high priority applications and provide a more favorable user experience.

BRIEF DESCRIPTION OF DRAWINGS

The disclosed embodiments have other advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will be made in detail to several embodiments, examples of which are illustrated in the accompanying figures. It is noted that wherever practicable similar or like reference numbers may be used in the figures and may indicate similar or like functionality. The Figures depict embodiments of the disclosed system (or method) for purposes of illustration only. One skilled in the art will readily recognize from the following description that alternative embodiments of the structures and methods illustrated herein may be employed without departing from the principles described herein.

Overview of Example Configurations

One embodiment of a device, system, method (or process) and/or computer readable storage medium includes an activity manager providing a centralized component allocating resources of a mobile computing device among various activities. An activity represents work performed using computing device resources, such as processor time, memory, storage device space or network connections. Examples of activities include synchronizing e-mail, synchronizing a contact database, modifying data stored in a scheduling application or any other activity making use of computing device resources. Thus, applications and system services executing on a mobile computing device use different activities to manipulate, store, receive or transmit data. In one embodiment, an application or system service requests generation of an activity by the activity manager. When the activity manager generates the activity, it associates a priority with the activity and identifies resources used by the activity. For example, the activity manager associates a first priority with activities generated by an application currently being used by a user, associates a second priority with an activity generated by an application initiated by a user but not currently in use, and associates a third priority with an activity generated by a background process. The priority levels may be used to provide activities currently receiving data from a user with preferred use of resources.

Additionally, the activity manager monitors applications being executed and allocates computing system resources based on the priority of a requested activity and the availability of resources that will be used by the requested activity. The activity manager also monitors system components on behalf of other system components and may initiate an activity when a trigger event occurs. For example, the activity manager may monitor an input device for a trigger event on behalf of a volume control subroutine (e.g., when the user presses an external button to lower the volume) and initiate an activity to lower the volume of the mobile computing device's audio system when the trigger event is detected. By allowing the activity manager to monitor for trigger events on behalf of other system components, the other system components can be closed to free up system resources. On a typical mobile computing device, tens or hundreds of system components can be closed in this manner, which allows more resources to remain available and accessible to other activities. Thus, the activity manager allows activities to be allocated resources to optimize performance of various activities and efficiently use available resources.

Example Mobile Computing Device

Figure 1A:
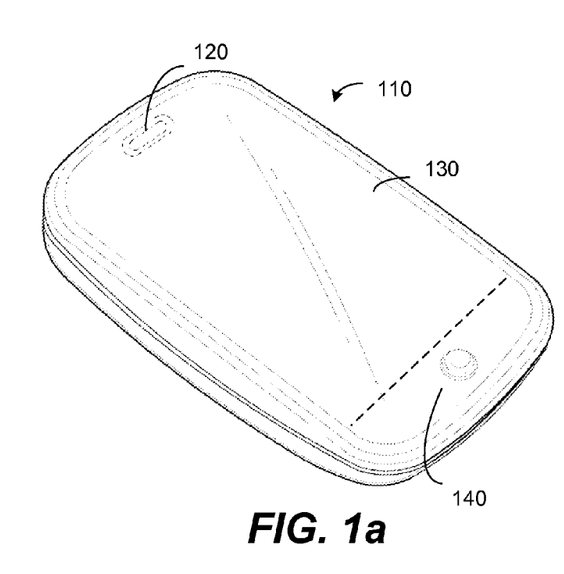
FIG. 1a illustrates one example embodiment of a mobile computing device in a first positional state.
Figure 1B:
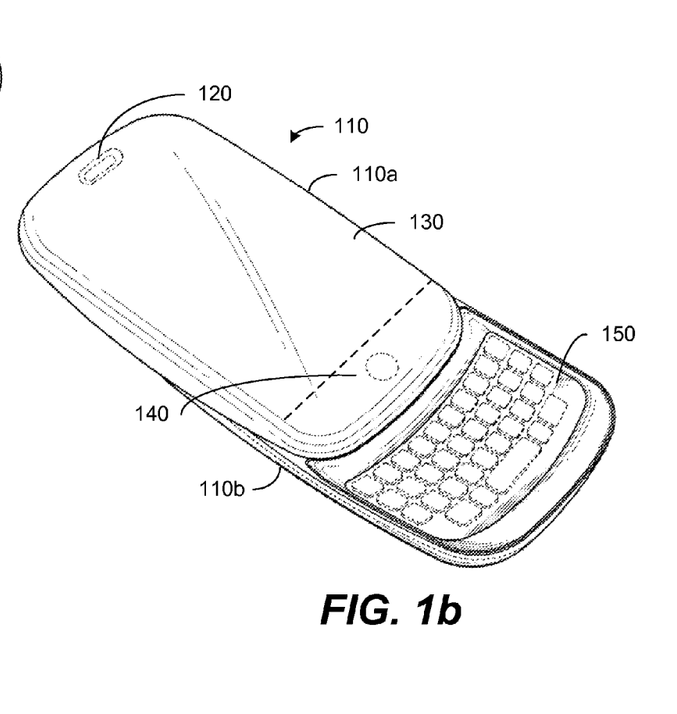
FIG. 1b illustrates one example embodiment of the mobile computing device in a second positional state.

In one example embodiment, the configuration as disclosed may be configured for use between a mobile computing device, that may be a host device, and an accessory device. FIGS. 1a and 1b illustrate one embodiment of a mobile computing device 110. FIG. (FIG.) 1a illustrates one embodiment of a first positional state of the mobile computing device 110 having telephonic functionality, e.g., a mobile phone or smartphone. FIG. 1b illustrates one embodiment of a second positional state of the mobile computing device 110 having telephonic functionality, e.g., a mobile phone, smartphone, netbook computer, tablet computer or laptop computer. The mobile computing device 110 is configured to host and execute a phone application for placing and receiving telephone calls.

It is noted that for ease of understanding the principles disclosed herein are in an example context of a mobile computing device 110 with telephonic functionality operating in a mobile telecommunications network. However, the principles disclosed herein may be applied in other duplex (or multiplex) telephonic contexts such as devices with telephonic functionality configured to directly interface with public switched telephone networks (PSTN) and/or data networks having voice over internet protocol (VoIP) functionality. Likewise, the mobile computing device 110 is only by way of example, and the principles of its functionality apply to other computing devices, e.g., tablet computers, laptop computers, notebook computers, netbook computers, desktop computers, server computers and the like.

The mobile computing device 110 includes a first portion 110a and a second portion 110b. The first portion 110a comprises a screen for display of information (or data) and may include navigational mechanisms. These aspects of the first portion 110a are further described below. The second portion 110b comprises a keyboard and also is further described below. The first positional state of the mobile computing device 110 may be referred to as an "open" position, in which the first portion 110a of the mobile computing device slides in a first direction exposing the second portion 110b of the mobile computing device 110 (or vice versa in terms of movement). The mobile computing device 110 remains operational in either the first positional state or the second positional state.

The mobile computing device 110 is configured to be of a form factor that is convenient to hold in a user's hand, for example, a personal digital assistant (PDA) or a smartphone form factor. For example, the mobile computing device 110 can have dimensions ranging from 7.5 to 15.5 centimeters in length, 5 to 15 centimeters in width, 0.5 to 2.5 centimeters in thickness and weigh between 50 and 250 grams.

The mobile computing device 110 includes a speaker 120, a screen 130, and an optional navigation area 140 as shown in the first positional state. The mobile computing device 110 also includes a keypad 150, which is exposed in the second positional state. The mobile computing device also includes a microphone (not shown). The mobile computing device 110 also may include one or more switches (not shown). The one or more switches may be buttons, sliders, or rocker switches and can be mechanical or solid state (e.g., touch sensitive solid state switch).

The screen 130 of the mobile computing device 110 is, for example, a 240×240, a 320×320, a 320×480, or a 640×480 touch sensitive (including gestures) display screen. The screen 130 can be structured from any transparent material, such as glass, plastic, or a thin-film or composite material. The touch sensitive screen may be a transflective liquid crystal display (LCD) screen. In alternative embodiments, the aspect ratios and resolution may be different without departing from the principles of the inventive features disclosed within the description. By way of example, embodiments of the screen 130 comprises an active matrix liquid crystal display (AMLCD), a thin-film transistor liquid crystal display (TFT-LCD), an organic light emitting diode (OLED), an interferometric modulator display (IMOD), a liquid crystal display (LCD), or other suitable display device. In an embodiment, the display displays color images. In another embodiment, the screen 130 further comprises a touch-sensitive display (e.g., pressure-sensitive (resistive)), electrically sensitive (capacitive), acoustically sensitive (SAW or surface acoustic wave), photo-sensitive (infra-red) including a digitizer for receiving input data, commands or information from a user. The user may use a stylus, a finger or another suitable input device for data entry, such as selecting from a menu or entering text data.

The optional navigation area 140 is configured to control functions of an application executing in the mobile computing device 110 and visible through the screen 130. For example, the navigation area includes an x-way (x is a numerical integer, e.g., 5) navigation ring that provides cursor control, selection, and similar functionality. In addition, the navigation area may include selection buttons to select functions displayed through a user interface on the screen 130. In addition, the navigation area also may include dedicated function buttons for functions such as, for example, a calendar, a web browser, an e-mail client or a home screen. In this example, the navigation ring may be implemented through mechanical, solid state switches, dials, or a combination thereof. In an alternate embodiment, the navigation area 140 may be configured as a dedicated gesture area, which allows for gesture interaction and control of functions and operations shown through a user interface displayed on the screen 130.

The keypad area 150 may be a numeric keypad (e.g., a dialpad) or a numeric keypad integrated with an alpha or alphanumeric keypad or character keypad 150 (e.g., a keyboard with consecutive keys of Q-W-E-R-T-Y, A-Z-E-R-T-Y, or other equivalent set of keys on a keyboard such as a DVORAK keyboard or a double-byte character keyboard).

Although not illustrated, it is noted that the mobile computing device 110 also may include an expansion slot. The expansion slot is configured to receive and support expansion cards (or media cards). Examples of memory or media card form factors include COMPACTFLASH, SD CARD, XD CARD, MEMORY STICK, MULTIMEDIA CARD, SDIO, and the like.

Example Mobile Computing Device Architectural Overview

Figure 2:
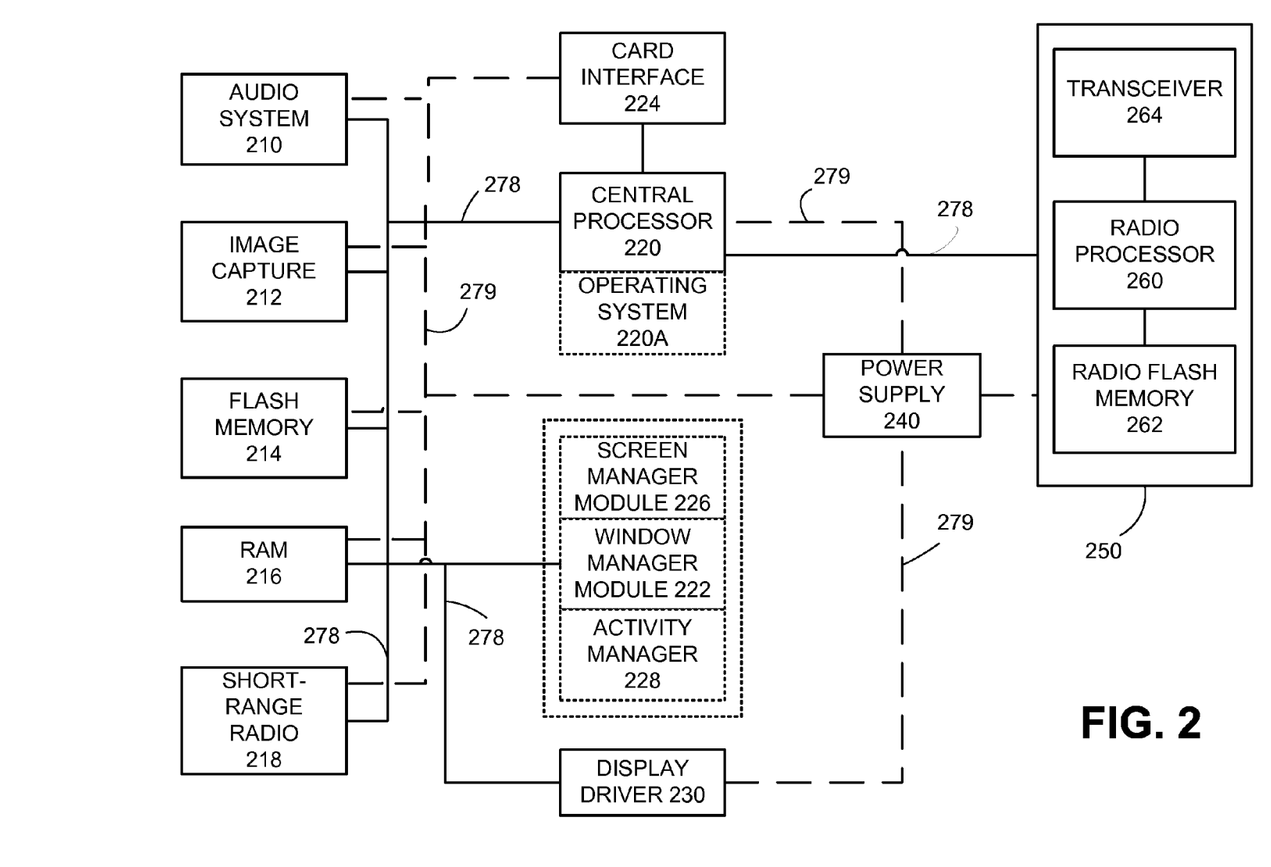
FIG. 2 illustrates one example embodiment of an architecture of a mobile computing device.

Referring next to FIG. 2, a block diagram illustrates one embodiment of an architecture of a mobile computing device 110, with telephonic functionality. By way of example, the architecture illustrated in FIG. 2 will be described with respect to the mobile computing device of FIGS. 1a and 1b. The mobile computing device 110 includes one or more processors (for ease of reference, referred to herein as central processor 220), a power supply 240, and a radio subsystem 250. Examples of a central processor 220 include processing chips and system based on architectures such as ARM (including cores made by microprocessor manufacturers), ARM XSCALE, AMD ATHLON, SEMPRON or PHENOM, INTEL ATOM, XSCALE, CELERON, CORE, PENTIUM or ITANIUM, IBM CELL, POWER ARCHITECTURE, SUN SPARC and the like.

The central processor 220 is configured for operation with a computer operating system. The operating system is an interface between hardware and an application, with which a user typically interfaces. The operating system is responsible for the management and coordination of activities and the sharing of resources of the mobile computing device 110. The operating system provides a host environment for applications that are run on the mobile computing device 110. As a host, one of the purposes of an operating system is to handle the details of the operation of the mobile computing device 110. Examples of an operating system include PALM OS and WEBOS, MICROSOFT WINDOWS (including WINDOWS 7, WINDOWS CE, WINDOWS PHONE and WINDOWS MOBILE), SYMBIAN OS, RIM BLACKBERRY OS, APPLE OS (including MAC OS and IPHONE OS), GOOGLE ANDROID, and LINUX.

The central processor 220 communicates with an audio system 210, an image capture subsystem (e.g., camera, video or scanner) 212, flash memory 214, RAM memory 216, and a short range radio module 218 (e.g., Bluetooth, Wireless Fidelity (WiFi) component (e.g., IEEE 802.11)). The central processor communicatively couples these various components or modules through a data line (or bus) 278. The power supply 240 powers the central processor 220, the radio subsystem 250 and a display driver 230 (which may be contact- or inductive-sensitive). The power supply 240 may correspond to a direct current source (e.g., a battery pack, including rechargeable) or an alternating current (AC) source. The power supply 240 powers the various components through a power line (or bus) 279.

The central processor 220 communicates with applications executing within the mobile computing device 110 through the operating system 220a. In addition, intermediary components, for example, a window manager module 222 and a screen manager module 226, provide additional communication channels between the central processor 220 and operating system 220 and system components, for example, the display driver 230.

In one embodiment, the window manager module 222 comprises software (e.g., integrated with the operating system) or firmware (lower level code that resides is a specific memory for that code and for interfacing with specific hardware, e.g., the processor 220). The window manager module 222 is configured to initialize a virtual display space, which may be stored in the RAM 216 and/or the flash memory 214. The virtual display space includes one or more applications currently being executed by a user and the current status of the executed applications. The window manager module 222 receives requests, from user input or from software or firmware processes, to show a window and determines the initial position of the requested window. Additionally, the window manager module 222 receives commands or instructions to modify a window, such as resizing the window, moving the window or any other command altering the appearance or position of the window, and modifies the window accordingly.

The screen manager module 226 comprises software (e.g., integrated with the operating system) or firmware. The screen manager module 226 is configured to manage content that will be displayed on the screen 130. In one embodiment, the screen manager module 226 monitors and controls the physical location of data displayed on the screen 130 and which data is displayed on the screen 130. The screen manager module 226 alters or updates the location of data as viewed on the screen 130. The alteration or update is responsive to input from the central processor 220 and display driver 230, which modifies appearances displayed on the screen 130. In one embodiment, the screen manager 226 also is configured to monitor and control screen brightness. In addition, the screen manager 226 is configured to transmit control signals to the central processor 220 to modify power usage of the screen 130.

Figure 3A:
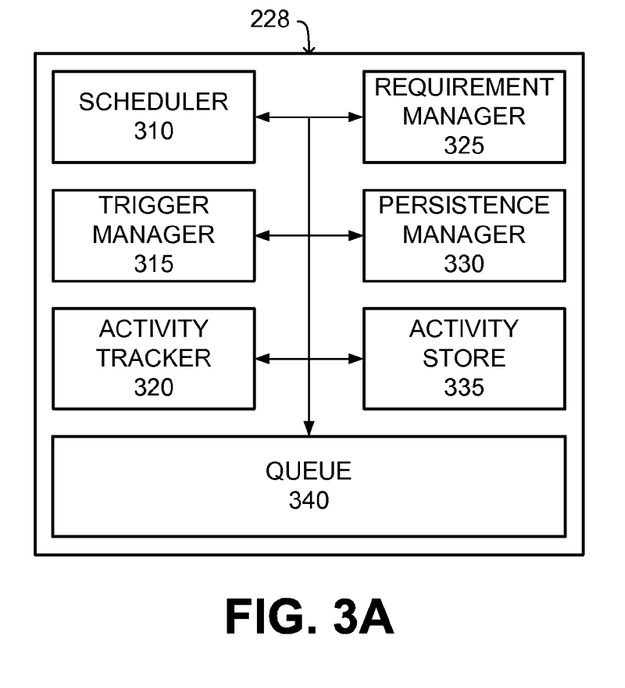
FIG. 3a illustrates one example embodiment of an activity manager included in a mobile computing device.
Figure 3B:
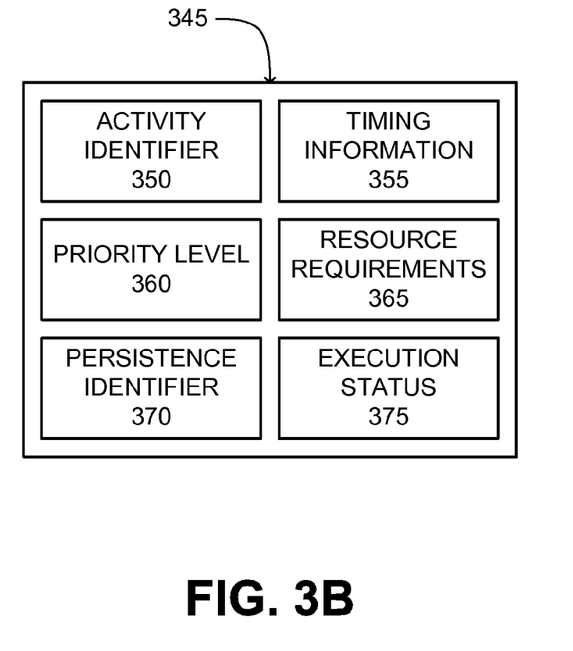
FIG. 3b illustrates one example embodiment of an activity object that is generated by the activity manager.
Figure 4:
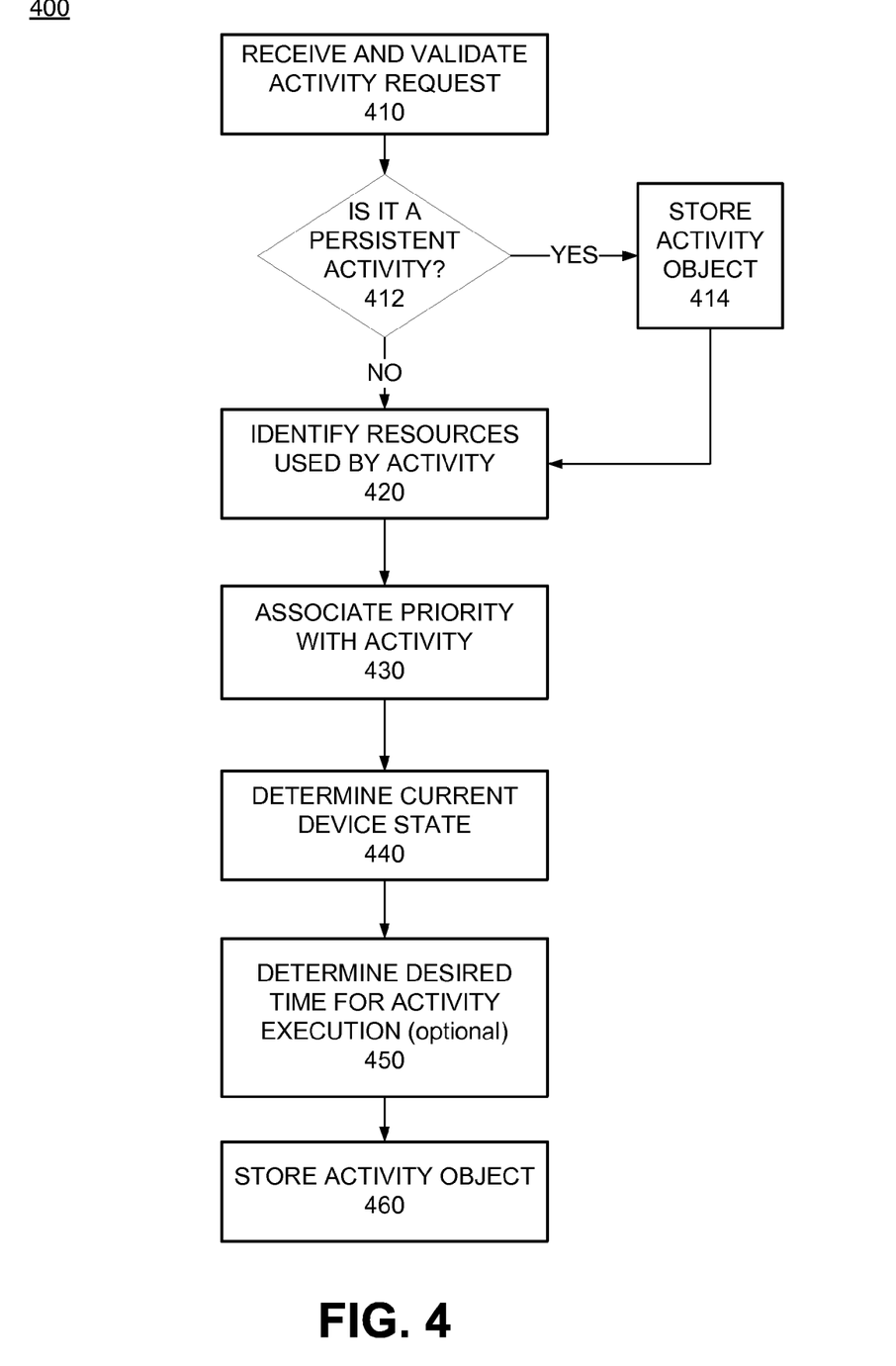
FIG. 4 illustrates one example embodiment of a method for generating an activity object associated with a requested activity in a mobile computing device.

An activity manager 228 comprises software (e.g., integrated with the operating system or configured to be an application operational with the operating system) or firmware (e.g., stored in the flash memory 214 or RAM 216) including instructions that, when executed, configure the central processor 220 to identify activities being executed by the central processor 220, identify the resources used by executing activities, identify the resources needed to execute a requested activity, and determine when to allocate resources to a requested activity. As used herein, an activity represents work performed using computing device resources, such as processor time, storage device space, memory, or network connections. Examples of activities include synchronizing e-mail, synchronizing a contact database, modifying data stored in a scheduling application, or any other activity making use of computing device resources. Thus, applications and system services use different activities to manipulate, store, receive or transmit data. The activity manager 228 identifies activities being executed by the mobile computing device 110, identifies the application or service initiating an executing activity and determines when resources are allocated to different activities. For example, the activity manager 228 associates a unique activity identifier with each activity and stores data describing the activity along with the activity identifier. FIGS. 3 and 4, further described below, provide further details about activity tracking.

In addition to determining current resource usage by activities, the activity manager 228 provides a centralized component for scheduling activities by allocating resources used by different activities. Hence, the activity manager 228 determines how mobile computing device 110 resources are allocated to requested activities. Providing a centralized component for resource allocation and activity scheduling improves application and or service performance by more efficiently allocating resources. To improve application or service execution, the activity manager 228 associates a priority level with each activity request that is received and uses the priority level, along with the availability of mobile computing device 110 resources, to determine resource allocation. In one embodiment, the activity manager 228 associates a first priority level with an application currently being used by a mobile computing device user (an "in-focus application"), so that the in-focus application has preferential access to available resources to provide the in-focus application with resources as soon as possible. This optimizes performance of the in-focus application, improving user interaction with the mobile computing device 110. Additionally, when scheduling activities for execution, the activity manager 228 may also use the occurrence of trigger conditions or timing information to allow mobile computing device resources to remain available until conditions are suitable for application execution. For example, an e-mail application that must wait for a network connection become available before it can synchronize the user's e-mail inbox can have the activity manager 228 monitor the network connection and launch the e-mail synchronization activity when the network connection becomes available. This allows the mail application to be closed during the waiting period, which allows mobile computing device resources to remain available for other activities. Scheduling of activities is further described below in conjunction with FIGS. 3 and 5, further described below.

It is noted that in one embodiment, central processor 220 executes logic (e.g., by way of programming, code, or instructions) corresponding to executing applications interfaced through, for example, the navigation area 140 or switches 170. It is noted that numerous other components and variations are possible to the hardware architecture of the computing device 200, thus an embodiment such as shown by FIG. 2 is just illustrative of one implementation for an embodiment.

The radio subsystem 250 includes a radio processor 260, a radio memory 262, and a transceiver 264. The transceiver 264 may be two separate components for transmitting and receiving signals or a single component for both transmitting and receiving signals. In either instance, it is referenced as a transceiver 264. The receiver portion of the transceiver 264 communicatively couples with a radio signal input of the device 110, e.g., an antenna, where communication signals are received from an established call (e.g., a connected or on-going call). The received communication signals include voice (or other sound signals) received from the call and processed by the radio processor 260 for output through the speaker 120 (or 184). The transmitter portion of the transceiver 264 communicatively couples a radio signal output of the device 110, e.g., the antenna, where communication signals are transmitted to an established (e.g., a connected (or coupled) or active) call. The communication signals for transmission include voice, e.g., received through the microphone 160 of the device 110, (or other sound signals) that is processed by the radio processor 260 for transmission through the transmitter of the transceiver 264 to the established call.

In one embodiment, communications using the described radio communications may be over a voice or data network. Examples of voice networks include Global System of Mobile (GSM) communication system, a Code Division, Multiple Access (CDMA system), and a Universal Mobile Telecommunications System (UMTS). Examples of data networks include General Packet Radio Service (GPRS), third-generation (3G) mobile (or greater), Long Term Evolution (LTE), High Speed Download Packet Access (HSDPA), High Speed Uplink Packet Access (HSUPA), and Worldwide Interoperability for Microwave Access (WiMAX).

While other components may be provided with the radio subsystem 250, the basic components shown provide the ability for the mobile computing device to perform radio-frequency communications, including telephonic communications. In an embodiment, many, if not all, of the components under the control of the central processor 220 are not required by the radio subsystem 250 when a telephone call is established, e.g., connected or ongoing. The radio processor 260 may communicate with central processor 220 using the data line (or bus) 278.

The card interface 224 is adapted to communicate, wirelessly or wired, with external accessories (or peripherals), for example, media cards inserted into the expansion slot (not shown). The card interface 224 transmits data and/or instructions between the central processor and an accessory, e.g., an expansion card or media card, coupled within the expansion slot. The card interface 224 also transmits control signals from the central processor 220 to the expansion slot to configure the accessory. It is noted that the card interface 224 is described with respect to an expansion card or media card; it also may be structurally configured to couple with other types of external devices for the device 110, for example, an inductive charging station for the power supply 240 or a printing device.

Example Activity Manager Configuration

FIGS. 3a and 3b illustrate a logical view of one embodiment of an activity manager 228 included in a mobile computing device 110. For purposes of illustration and example, FIG. 3a depicts an embodiment of an activity manager 228 including a scheduler 310, a trigger manager 315, an activity tracker 320, a requirement manager 325, a persistence manager 330, an activity store 335, and a queue 340 that are communicatively coupled to each other. In an embodiment, the modules depicted in FIG. 3a are implemented by instructions for performing the described actions embodied or stored within one or more computer readable storage media, e.g., flash memory 214 or RAM 216, that are executable by a processor, such as central processor 220. FIG. 3b illustrates one embodiment of an activity object 345 that is created by the activity manager 228 in response to a request to perform or initiate an activity. An activity object 345 includes a unique activity identifier 350, timing information 355, a priority level 360, resource requirements 365, a persistence identifier 370, and an execution status 375. Those of skill in the art will recognize that the components of the activity manager 228 identified in FIG. 3a and the activity object 345 identified in FIG. 3b may be implemented in embodiments of hardware and/or software or combinations thereof. Moreover, other embodiments can include different and/or additional components than the ones shown in FIGS. 3a and 3b.

The activity manager 228 receives requests to perform or initiate activities from one or more applications or services executing on the mobile computing device 110 and generates activity objects 345 associated with each requested activity.

The activity request includes a unique identifier that is generated by the application or service, and the activity manager 228 stores this as the activity identifier 350. If the request is not for an interval activity, the application or service will also specify a time or time interval when the activity should be executed and include that information in the activity request. This is stored as timing information 355 in the activity object 345. Timing information is not included in requests for interval activities; for these requests, the scheduler 310 modifies the timing information 355 to assign the request to the next available time slot.

In addition to assigning an identifier 350 and timing information 355, the activity manager 228 also determines a priority level 360 and resource requirements 365 for each activity object. The priority level 360 is used to determine how soon the activity should be allocated computing resources, and priority levels can be assigned in a way that optimizes the performance of certain applications or services. As discussed above, the activity manager 228 might assign a high priority level 360 to activities associated with an application that is currently being used by the user (an "in-focus application"), which would provide the in-focus application with preferential access to computing resources and give the user the perception that the mobile computing device 110 is operating smoothly.

The resource requirements 365 contain a list of resources that must be available before the activity can run. Although it is difficult to determine the computing requirements of an activity before it is executed (e.g., the precise number of CPU cycles or amount of memory), some activities have predictable resource requirements that must be met before they can be executed. For example, an activity to synchronize a user's contacts with a web server would require the presence of a network connection before it can be executed. The activity manager 228 determines whether an activity has any predictable resource requirements 365 and stores them in the activity object 345. In addition to system resources, the resource requirements 365 may also require that certain data from an application or service be present before the activity can be executed. For example, an activity to send a text message through Short Message Service (SMS) would require the presence of at least one recipient's phone number in addition to a network connection.

Apart from creating timing information 355 for interval activities, the scheduler 310 also keeps track of when activities should run, and it may attempt to optimize resource use by preventing activities that use substantially the same resources from running at the same time. The scheduling of a requested activity is further described below in conjunction with FIG. 5. The activity manager 228 uses the priority level 360 associated with a requested activity and data from the activity tracker 320 and the requirement manager 330 to prioritize resource use in the mobile computing device 110 and more efficiently execute applications or services requesting activities.

The trigger manager 315 monitors the mobile computing system 110 to determine whether the resources or data that are required to execute requested activities are present. It periodically polls different system components and observes the responses until they indicate that the required resources are available. The trigger manager 315 may also capture data from applications or services executing on the mobile computing device 110 to determine when an application or service generates data required for a requested activity. Responsive to determining that the resources or data exist to execute a requested activity, the trigger manager notifies the scheduler 310, which proceeds to mark the activity for execution. Thus, the trigger manager 315 captures from various sources within the mobile computing device 110 to identify conditions for execution of a requested application, allowing the scheduler 310 to generate an activity and return resources to the mobile computing device 110 until the needed resources are available to execute the requested application.

The requirement manager 325 captures data from various components or systems in the mobile computing device 110 to maintain a real-time record of all the resources that are in use by running activities and all the resources that are available for pending activities. For example, the requirement manager 325 determines memory usage (or memory availability), processor usage, battery charge, network connectivity, network connection quality, or other data describing mobile computer device 110 resources.

The activity tracker 320 receives activity objects 345 from the scheduler 310 and uses the priority levels 360 of the activity objects 345 and data from the requirement manager 325 to determine the order in which those activities should run. When an activity is executing, the activity tracker 320 modifies the execution status 375 included in the corresponding activity object 345, allowing the activity manager 228 to identify activities being executed by the mobile computing device 110. The activity tracker 320 may also associate resource usage data from the requirement manager 325 with activity identifiers to describe resource use by various activities. Thus, the activity tracker 320 and requirement manager 325 can work together to generate data that describes mobile computing device 110 resource usage or identifies activities being executed by the mobile computing device 110 at different times.

The activity manager 228 uses data from the activity tracker 320 and the requirement manager 325 to determine when a requested activity is allocated resources. For example, to determine whether to execute an activity, the activity manager 228 may use data describing mobile computing device 110 memory usage, mobile computing device 110 battery life, the priority level 360 associated with the activity, and the number of currently executing applications. However, in other embodiments, the activity manager 228 may use different and/or additional criteria from the trigger manager 315, the activity tracker 320, the requirement manager 325, and within the scheduler 310 to schedule execution of activities.

In one embodiment, the activity manager 228 also includes a persistence manager 330. The persistence manager 330 identifies activities that persist after the mobile computing device 110 is rebooted by modifying the persistence identifier 370 in the corresponding activity object 345. For example, the persistence manager 330 identifies stored activity objects 345 that are automatically updated and re-scheduled for execution when an activity prematurely ceases executing or the mobile computing device 110 is powered off. In one embodiment, the persistence manger 330 identifies activities that are allocated resources when the mobile computing device 110 reboots, allowing the identified activities to be executed by the activity manager 228 without an application or service initially requesting an activity identified by the persistence manager 330. For example, the persistence manager 340 may identify currently executing activities as persistent to expedite the executing activities if the mobile computing devices 110 crashes, or loses power, while the activities are executing.

The activity store 335 is a portion of a computer readable storage medium, such as the flash memory 214 or the RAM 216, that stores activity objects 345 uniquely identifying and describing activities being executed or activities to be executed. As described above, each activity object 345 includes a unique activity identifier 350, a scheduled resource allocation time 355, a priority level 360 assigned by the scheduler 310, and data identifying resources used by the activity 365. An activity object may also include one or more triggers identifying resources used by an activity or data from an application or service used by an activity, allowing the activity object to identify resources used to execute the identified activity. In one embodiment, an activity object also includes a persistence identifier 370 determining whether the activity associated with the activity object persists when the mobile computing device 110 reboots or if the activity is interrupted. An activity object also includes a status indicator 375 received from the activity tracker 320 specifying whether the activity associated with the activity object is currently executing.

The activity manager 228 also includes a queue 340 that acts as a buffer for activity objects 345 currently using mobile computing device 110 resources and activity objects 345 for which mobile computing device 110 resources are available ("runnable" activities). The activity tracker 320 identifies activities that are waiting to run and organizes their corresponding activity objects 345 based on the timing information 355 determined by the scheduler 310, the priority level 360 of the activity object 345, and the available mobile computing device 110 resources. For example, the queue 340 may be a first-in, first-out queue, so that activity objects 345 that are initially stored in the queue 340 by the activity tracker 320 are allocated resources before activity objects 345 that are stored in the queue 340 later. In one embodiment, a portion of the activity store 335 is configured to act as the queue 340 by organizing runnable and currently running activity objects 345 based on the schedule determined by the scheduler 310. Alternatively, the queue 340 can identify a subset of the activity objects 345 stored in the activity store 335 that are currently executing and activity objects 345 scheduled for execution within a time interval from the current time or activity objects 345 using mobile computing device 110 resources that are currently available.

By associating a priority level 360 with each requested activity and identifying resources 365 used by each activity and/or data used by each activity, the activity manager 228 can schedule activities based on the availability of mobile computing device 110 resources and the priority of different activities. Accounting for resource availability and activity priority level allows resources to be allocated so that mobile computing device 110 resources and execution of high priority applications are optimized. For example, the activity manager 228 schedules activities so that applications with which a user is currently interacting have priority access to mobile computing device 110 resources to optimize performance of the application with the user is currently interacting to provide an optimal user experience. Use of the activity manager 228 to generate and schedule activity objects 345 are further described below in conjunction with FIGS. 4 and 5.

Generation of an Activity Object Identifying a Requested Activity

FIG. 4 illustrates one example embodiment of a process 400 for generating an activity object associated with a requested activity in a mobile computing device 110. In an embodiment, the steps depicted in the processor 400 are implemented by instructions for performing the described actions embodied or stored within a computer readable medium, e.g., flash memory 214 or RAM 216, that are executable by one or more processors, such as the processor 220. Those of skill in the art will recognize that the process 400 may be implemented in embodiments of hardware and/or software or combinations thereof. Moreover, other embodiments can include different and/or additional steps than the ones shown in FIG. 4.

Initially, the activity manager 228 receives 410 a request to execute an activity from an application or a service. For example, the activity manager 228 receives 410 a request to synchronize e-mail from an e-mail application or receives a request to synchronize calendar data with a remote source from a calendar application. The activity manager 228 receives 410 requests for activity execution from each application or service operating on the mobile computing device 110, providing a centralized component for allocating resources used by applications or services. After the request has been received, it undergoes a validation process 410 to ensure that the syntax and inputs are legal. If the request is validated 410, the activity manager 228 checks whether the request is for a persistent activity 412. A persistent activity is immediately stored 414 in the activity store 335 before the process is allowed to continue.

Next, the activity manager uses data included in the request for activity execution, to identify 420 the application or service requesting the activity and also identify 420 the mobile computing device 110 resources used by the activity. In one embodiment, the request for activity execution also identifies one or more trigger conditions, such as resources or data used by the activity, specifying when the mobile computing device 110 has resources or information used to execute the activity. The request also contains a unique activity identifier 350 that is included in an activity object 345 associated with the requested activity.

The activity manager 228 then associates 430 a priority level 360 with the requested activity. The priority level 360 determines how mobile computing device 110 resources are allocated to the requested activity. In one embodiment, the priority level 360 is assigned based on the application or service requesting the activity. For example, if a user of the mobile computing device 110 is currently interacting with the application requesting the activity (i.e., the request comes from an "in-focus" application or service), the activity manager 228 associates 430 a first priority level with the activity. If the request is received 410 from an application or service that was previously initiated by a user of the mobile computing device 110 but is not currently receiving user interaction (i.e., a "foreground" application or service) the activity manager 228 associates 420 a second priority level with the activity. And, if the request is received 410 from an activity or service that is operating, but not initiated by a user of the mobile computing device 110, the activity manager 228 associates 430 a third priority level with the activity.

By using the application or service requesting the activity to determine the priority level associated with an activity, the activity manager 228 can optimize the performance of an application or service with which a mobile computing device 110 user is interacting. In the above-described example, the activity associated with the first priority level is allocated resources at an earliest interval, while activities associated with the third priority level are allocated resources after activities associated with the first and second priority levels. The priority level associated 430 with an activity is then stored in the activity object 345 with the activity identifier 350 corresponding to the requested activity.

The activity manager 228 then uses data generated by the requirement manager 325 and the activity tracker 320 to determine 440 the current state of the mobile computing device 110. The activity tracker 320 identifies the activities currently being executed, or currently using mobile computing device 110 resources, while the requirement manager 330 identifies resources of the mobile computing device 110 currently being used by one or more executing activities or services. Hence, the activity tracker 320 and the requirement manager 325 allow the activity manager 228 to determine 440 the current state of the mobile computing device 110 by identifying activities currently using mobile computing device 110 resources, identifying resources currently in use, or identifying resources available for execution by an activity. For example, the requirement manager 330 determines 440 memory usage (or memory availability), processor usage, battery charge, network connectivity, network connection quality, or other data describing mobile computing device 110 resources used by activities, and the activity tracker 320 indicates which activities are using the resources of the mobile computing device 110.

Using the timing information 355 assigned by the scheduler 310, the priority level 360 associated with the requested activity, the resources requirements 365 identified by the activity manager 228, and the current mobile computing device 110 state, the activity manager 228 optionally determines 450 a desired time for execution of the activity (or interval between subsequent executions), e.g., when the requested activity is allocated resources from the mobile computing device 110. Since it is difficult to predict the run time of activities that are further up in the queue, the desired time for execution will only be an estimate of when execution may occur for a queued activity. For an immediate activity this will be a time when the activity becomes executable (or "runnable"), presuming other requirements are met. For example, if the requested activity is associated with a first priority level, the activity manager 228 determines 450 that resources should be provided to the requested activity as soon as possible, and may halt or suspend resource usage by activities associated with other priority levels to access mobile computing device resources as soon as possible. As another example, if the requested activity is associated with a third priority level, the activity manager 228 may determine 450 that resources are not allocated to the requested activity until other activities have completed.

In one embodiment, the activity manager 228 uses data from the trigger manager 315 and the requirement manager 325 to determine 450 when resources are allocated to the requested activity. As described above, the requirement manager 325 monitors one or more systems of the mobile computing device 110 to determine when resources used by the requested activity are available and notifies the activity manager 228 when resources are available, allowing resources to be allocated to an activity responsive to the availability of the resources used by the requested application. In one embodiment, the trigger manager 315 may also capture data from applications or services executing by the mobile computing device 110 and notify the activity manager 228 when an application or service generates data used by a requested activity, allowing activity resource allocation to depend on the availability of data used by the requested activity. Hence, in one example embodiment, the trigger manager 315 and the requirement manager 325 allow conditions on resource or data to be identified and used to determine 450 when the requested activity is allocated resources based on the availability of resources or data used by the requested activity. This permits the activity manager 228 to return resources to the mobile computing device 110 for allocation to other activities until the needed resources are available to execute the requested application.

After determining 450 the activity execution time, or the time when the activity is allocated resources, the activity object 345 associated with the requested activity is stored 460 in the activity store 335. In one embodiment, the activity manager 228 includes a queue 340 where the location of an activity object 345 in the queue determines the time when resources are allocated to the activity associated with an activity object 345. As described above, the activity object 345 includes a unique identifier 350 associated with the requested activity, a determined execution time 335 for the requested activity, a priority level 360 associated with the requested activity, data describing the resources 365 used by the requested activity, a persistence identifier 370 for the activity, and the execution status 375 of the activity. By storing 460 activity objects 345 in the activity store 335, the activity manager 228 maintains a record of activities to be executed and estimated times for activity execution, providing a centralized location for managing execution of multiple activities.

Figure 5:
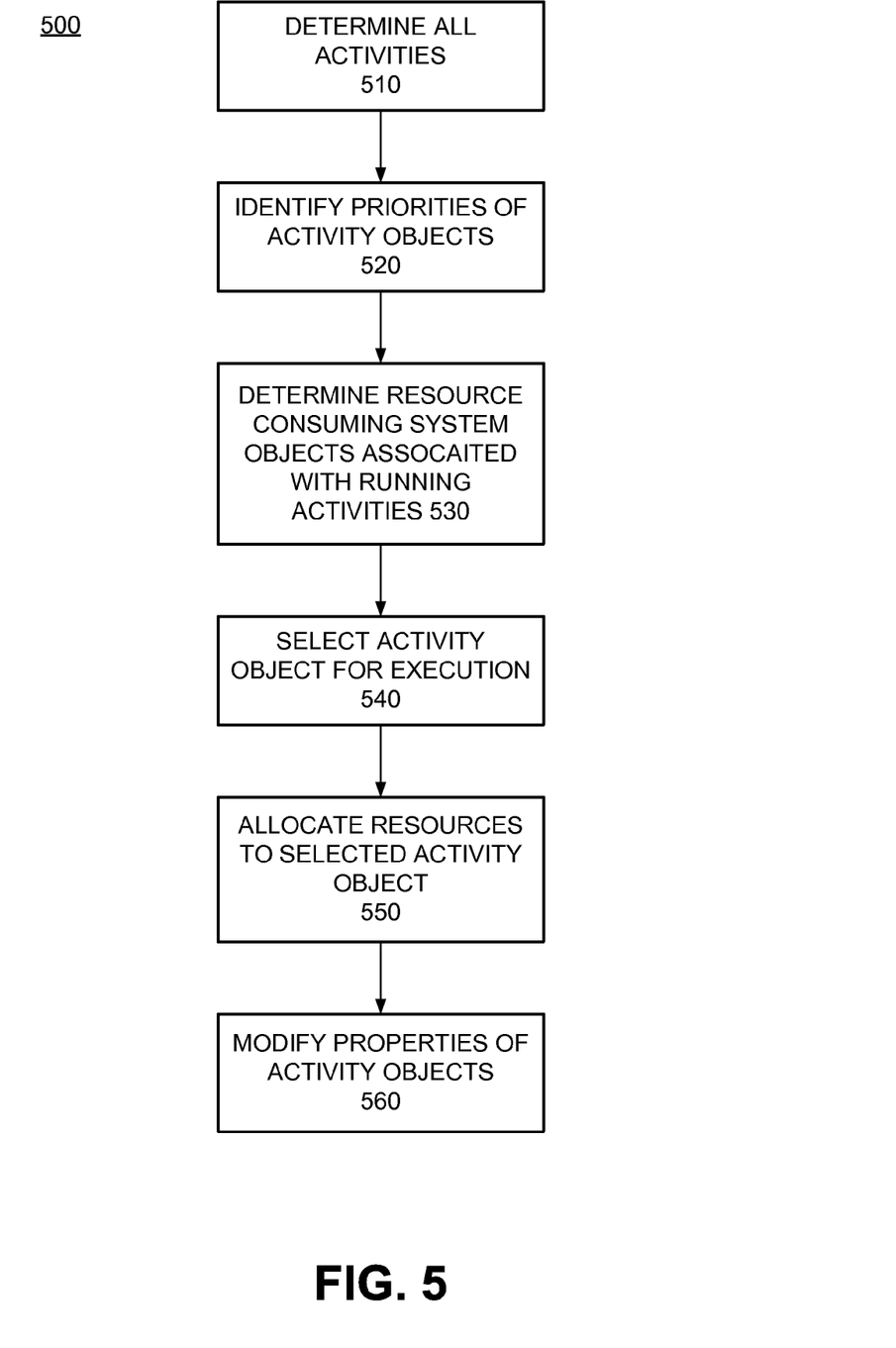
FIG. 5 illustrates one example embodiment of a method for allocating resources for use by an activity in a mobile computing device.

FIG. 5 illustrates one example embodiment of a method 500 for allocating resources for use by an activity in a mobile computing device 110. In an embodiment, the steps depicted in the process 500 are implemented by instructions for performing the described actions embodied or stored within a computer readable medium, e.g., flash memory 214 or RAM 216, that are executable by one or more processors, such as the processor 220. It is noted that the process 500 may be implemented in embodiments of hardware and/or software or combinations thereof. Moreover, other embodiments can include different and/or additional steps than the ones shown in FIG. 5.

At a high level, the process identifies all running activities within the system. The process then identifies all resource consuming system objects associated with those running activities. The process assigns resources to those system objects based on the relative priorities of the activities associated with them. It is noted that a single system object may have several associated activities.

The process begins when the activity tracker 320 and the requirement manager 325 determine 510 the current state of the mobile computing device 110 by identifying all running activities and identifying all resource consuming system objects associated with those running activities in the computing device 110. The activity tracker 320 determines 510 the activities currently being executed, or currently using mobile computing device 110 resources, and the requirement manager 325 determines 510 the resources of the mobile computing device 110 being used by one or more activities and/or services. For example, the activity tracker 320 uses the queue 340 to determine 510 which activities are currently running, and the requirement manager 325 determines 510 memory usage (or memory availability), processor usage, battery charge, network connectivity, network connection quality, or other data describing mobile computing device 110 resources for each of those processes. Once the activity manager 228 has a complete list of all running activities and their resource use, it is possible to determine what system resources are still available to execute pending activities. This information about running activities and their resource use can also be used to selectively terminate running activities with low priority to free up system resources in the event that a pending activity has higher priority.

After the activity manager 228 has received 510 information about the current running activities and their respective resource loads from the activity tracker 320 and requirement manager 325, it identifies 520 the priorities of activity objects 345 in the activity store 350 and determines 530 which resources are currently being used by the resource consuming system objects that are associated with running activities. To optimally allocate resources to various activities, the activity manager 228 uses the resource information received from the activity tracker 320 and requirement manager 325 and the priority levels 360 of all the runnable activities in the queue 340 to select an activity for execution 540. By identifying 520 the priority level 360 associated with various activities, the activity manager 228 allows resources to be allocated to higher-priority applications more rapidly. For example, if a stored activity object 345 is associated with an "in-focus" application or service, then the activity object 345 has a high priority level 360, so the activity manager 228 is more likely to select 540 the activity object 345 associated with an "in-focus" application or service. If a stored activity object 345 is associated with an activity or service operating but not initiated by a user of the mobile computing device 110, then the activity object 345 has a low priority level 360. This means the activity manager 228 is less likely to select 540 the activity object 345, allowing the activity manager 228 to more rapidly allocate resources to activities associated with applications or services currently being used by a user or previously initiated by a user.

After identifying 520 the priority levels 360 of pending activities and determining 530 the resources used by running activities, the activity manager 228 is able to select 540 an activity object that uses the available mobile computing device 110 resources to optimize performance of a user-initiated or user-accessed activity. In one embodiment, user input received by the activity manager 228 may be used to select 540 an activity object. For example, the activity manager 228 may receive an input to pause or cancel a running activity to free up resources used by a different activity. Hence, the activity manager 228 may provide a mobile device 110 user with additional control over selection of an activity object, increasing user control over mobile computing device 110 operation.

Once an activity has been selected 540 for execution, the activity manager 228 allocates 550 mobile computing device 110 resources to the selected activity and instructs the activity tracker 320 to modify 560 the execution status 375 of the activity object 345 to indicate that the selected activity has been allocated mobile computing device 110 resources. Modifying 560 the execution status 375 allows the activity store 335 to accurately identify the activities that are receiving resources from the mobile computing device 110 and also identify activities to receive resources. Hence, the activity objects 345 in the activity store 335 are dynamically modified to maintain data describing activities using mobile computing device 110 resources and activities to receive mobile computing device 110 resources.

What is claimed is:

1. A computer-implemented method for allocating resources of a mobile computing device to an activity, the method comprising:
   in the mobile computing device, in response to a request for the activity from a source, the source being one of an application or a service executing on the mobile computing device:
   identifying resources of the mobile computing device to be used to perform the activity;
   associating a priority level with the activity, the priority level determined at least in part by the source of the request for the activity;
   determining a schedule for allocating the resources of the mobile computing device for the activity based on the priority level associated with the activity and an availability of the identified resources; and
   generating an activity object associated with the activity, the activity object including a unique identifier associated with the activity, data identifying the resources of the mobile computing device to be used to perform the activity, data identifying whether the activity automatically executes after the mobile computing device reboots, and a status indicator specifying whether the activity is currently executing.

2. The method of claim 1, further comprising:
   responsive to a first priority level being associated with the activity, allocating the identified resources of the mobile computing device to the activity at a first time interval; and
   responsive to a second priority level being associated with the activity, allocating the identified resources of the mobile computing device to the activity at a second time interval that is later in time than the first time interval.

3. The method of claim 2, wherein the first priority level is associated with an activity requested by a source currently receiving data and the second priority level is associated with an activity requested by a previously initiated source that is not currently receiving data.

4. The method of claim 1, further comprising storing the activity object in a non-transitory computer-readable storage medium.

5. The method of claim 2, further comprising:
   responsive to a third priority level associated with the activity, allocating the identified resources of the mobile computing device to the activity at a third time interval that is later in time than the second time interval.

6. The method of claim 5, wherein the third priority level is associated with an activity requested by a source not initiated by a user of the mobile computing device.

7. The method of claim 1, further comprising:
   receiving a user input for a currently executing application associated with the activity, wherein the input modifies the status indicator of the activity object associated with the activity.

8. The method of claim 7, wherein the user input comprises at least one of an input to pause the activity or an input to terminate the activity.

9. The method of claim 1, further comprising maintaining a real-time record of a set of resources being utilized by a plurality of running activities and a set of available resources for pending activities.

10. The method of claim 9, wherein maintaining the real-time record includes determining a memory usage and a processor usage for the set of resources.

11. The method of claim 1, wherein the activity includes one or more of synchronizing e-mail, synchronizing a contact database, or modifying data stored in a scheduling application.

12. The method of claim 1, wherein the resources include one or more of memory availability, processor usage, battery charge, network connectivity, or network connection quality.

13. A non-transitory computer readable storage medium storing instructions for allocating resources of a mobile computing device to an activity, wherein the instructions, when executed by one or more processors of the mobile computing device, cause the one or more processors to:
   in the mobile computing device, in response to a request for the activity from a source, the source being one of an application or a service executing on the mobile computing device:
   identify resources of the mobile computing device to be used to perform the activity;
   associate a priority level with the activity, the priority level determined at least in part by the source of the request for the activity;

determine a schedule for allocating the identified resources of the mobile computing device for the activity based on the priority level associated with the activity and an availability of the identified resources; and generate an activity object associated with the activity, the activity object including a unique identifier associated with the activity, data identifying the resources of the mobile computing device to be used to perform the activity, data identifying whether the activity automatically executes after the mobile computing device reboots, and a status indicator specifying whether the activity is currently executing.

14. The non-transitory computer readable storage medium of claim 13, wherein the instructions, when executed, further cause the one or more processors to:

responsive to a first priority level associated with the activity, allocate the identified resources of the mobile computing device to the activity at a first time interval; and responsive to a second priority level associated with the activity, allocate the identified resources of the mobile computing device to the activity at a second time interval that is later in time than the first time interval.

15. The non-transitory computer readable storage medium of claim 14, wherein the first priority level is associated with an activity requested by a source currently receiving data and the second priority level is associated with an activity requested by a previously initiated source that is not currently receiving data.

16. The non-transitory computer readable storage medium of claim 13, further comprising instructions that cause the processor to store the activity object in an activity store, the activity store including a plurality of activity objects each associated with a corresponding activity.

17. The non-transitory computer readable storage medium of claim 14, wherein the instructions, when executed, further cause the one or more processors to:

responsive to a third priority level being associated with the activity, allocate the identified resources of the mobile computing device to the activity at a third time interval that is later in time than the second time interval.

18. The non-transitory computer readable storage medium of claim 17, wherein the third priority level is associated with an activity requested by a source not initiated by a user of the mobile computing device.

19. The non-transitory computer readable storage medium of claim 13, wherein the instructions, when executed, further cause the one or more processors to maintain a real-time record of a set of resources being utilized by a plurality of running activities and a set of available resources for pending activities.

20. The non-transitory computer readable storage medium of claim 13, wherein maintaining the real-time record includes determining a memory usage and a processor usage for the set of resources.

21. The non-transitory computer readable storage medium of claim 13, wherein the activity includes one or more of synchronizing e-mail, synchronizing a contact database, or modifying data stored in a scheduling application.

* * * * *